(12) United States Patent
Buehs et al.

(10) Patent No.: US 10,046,669 B2
(45) Date of Patent: Aug. 14, 2018

(54) PROTECTION DEVICE FOR A VEHICLE FOR PREVENTING CONTACT VOLTAGES

(71) Applicants: SIEMENS AKTIENGESELLSCHAFT, Munich (DE); SCANIA CV AB, Soedertaelje (SE)

(72) Inventors: Florian Buehs, Berlin (DE); Klaus Dietrich, Berlin (DE); Frank Gerstenberg, Berlin (DE); Hasso Georg Gruenjes, Erlangen (DE); Hans-Peter Lang, Eckental/Brand (DE); Michael Lehmann, Erlangen (DE); Johan Lindstroem, Nykoeping (SE); Thomas Stark, Woltersdorf (DE); Goeran Saenger, Berlin (DE); Christer Thoren, Haegersten (SE)

(73) Assignees: Siemens Aktiengesellschaft, Munich (DE); Scania CV AB, Soedertaelje (SE)

( * ) Notice: Subject to any disclaimer, the term of this patent is extended or adjusted under 35 U.S.C. 154(b) by 115 days.

(21) Appl. No.: 15/027,087

(22) PCT Filed: Sep. 25, 2014

(86) PCT No.: PCT/EP2014/070535
§ 371 (c)(1),
(2) Date: Apr. 4, 2016

(87) PCT Pub. No.: WO2015/049161
PCT Pub. Date: Apr. 9, 2015

(65) Prior Publication Data
US 2016/0236590 A1    Aug. 18, 2016

(30) Foreign Application Priority Data

Oct. 2, 2013 (DE) .......... 10 2013 220 095
Dec. 18, 2013 (DE) .......... 10 2013 226 356

(51) Int. Cl.
*B60L 5/00* (2006.01)
*B60L 3/00* (2006.01)
(Continued)

(52) U.S. Cl.
CPC ............. *B60M 5/02* (2013.01); *B60L 3/0069* (2013.01); *B60L 5/00* (2013.01); *B60L 9/18* (2013.01);
(Continued)

(58) Field of Classification Search
CPC ... B60M 5/00; B60M 1/04; B60L 3/04; B60L 3/08; B61L 1/12
See application file for complete search history.

(56) References Cited

U.S. PATENT DOCUMENTS 3,889,788 A * 6/1975 Littler .................. B60M 1/20
174/137 R
4,133,505 A * 1/1979 Bongiorno .............. B61L 3/185
191/2
(Continued)

FOREIGN PATENT DOCUMENTS

DE         3343590 A1    6/1984
DE    102004018521 A1    11/2005
(Continued)

OTHER PUBLICATIONS

Machine Translation of DE3343590 obtained from EPO website on Sep. 5, 2017.*
(Continued)

*Primary Examiner* — James A Shriver, II
*Assistant Examiner* — Vaughn Coolman
(74) *Attorney, Agent, or Firm* — Laurence Greenberg; Werner Stemer; Ralph Locher

(57) ABSTRACT

A vehicle has an electric or hybrid-electric traction drive supported by an ungrounded vehicle frame. The vehicle also
(Continued)

has a current collector, which can be electrically connected to the traction drive and which can be brought in galvanic contact with a contact line of a grounded contact-line system to supply traction energy. The vehicle contains an electrical protection system for avoiding dangerous contact voltages on the vehicle frame or on a vehicle part connected to the vehicle frame in a conductive manner. The protection system has a first protection stage, a second protection stage, and a switching element, by which the protection system can be switched between the first and the second protection stages. The first protection stage provides greater safety from dangerous contact voltages than the second protection stage. Thus, a protection system can be provided which provides sufficient safety in all operating states of the vehicle.

9 Claims, 1 Drawing Sheet

(51) Int. Cl.
  B60M 5/02 (2006.01)
  B60L 9/18 (2006.01)
  B60L 11/18 (2006.01)
(52) U.S. Cl.
  CPC ....... B60L 11/1809 (2013.01); *B60L 2200/18* (2013.01)

(56) References Cited

U.S. PATENT DOCUMENTS

| | | | | |
|---|---|---|---|---|
| 4,694,125 | A * | 9/1987 | Takei | B60L 3/04 191/85 |
| 5,531,301 | A * | 7/1996 | Makino | B60L 5/00 191/55 |
| 6,278,256 | B1 * | 8/2001 | Aoyama | B60L 3/003 318/801 |
| 6,294,886 | B1 * | 9/2001 | Gibard | B60L 5/42 180/65.31 |
| 8,615,341 | B2 | 12/2013 | Kitanaka | |
| 8,754,607 | B2 * | 6/2014 | Shimamura | B60L 1/00 180/65.1 |
| 8,761,994 | B2 * | 6/2014 | Mikulec | B60K 6/48 180/65.25 |
| 8,776,969 | B2 * | 7/2014 | Asplund | B60L 3/0046 104/243 |
| 9,018,792 | B2 * | 4/2015 | Still | B60L 1/003 180/65.1 |
| 9,102,239 | B2 * | 8/2015 | Kim | B60L 3/08 |
| 9,401,598 | B2 * | 7/2016 | Koch | B60L 3/0007 |
| 9,403,526 | B2 * | 8/2016 | Saito | B60L 5/045 |
| 9,499,058 | B2 * | 11/2016 | Im | H02H 11/001 |
| 9,831,644 | B2 * | 11/2017 | Kawasaki | H02B 1/46 |
| 9,868,355 | B2 * | 1/2018 | Hatanaka | B60L 9/16 |
| 9,899,828 | B2 * | 2/2018 | Schoenknecht | H02H 9/00 |
| 2007/0126377 | A1 * | 6/2007 | Chanal | B60L 9/28 318/109 |
| 2009/0179718 | A1 * | 7/2009 | Aubigny | H01H 33/38 335/126 |
| 2011/0049977 | A1 * | 3/2011 | Onnerud | B60L 3/0046 307/9.1 |
| 2011/0166736 | A1 * | 7/2011 | Kitanaka | B60L 3/003 701/22 |
| 2013/0229052 | A1 * | 9/2013 | Kitanaka | B60L 3/003 307/9.1 |
| 2014/0197683 | A1 * | 7/2014 | Migita | B60L 3/0046 307/9.1 |
| 2014/0211345 | A1 * | 7/2014 | Thompson | B60L 11/1816 361/42 |
| 2014/0368031 | A1 | 12/2014 | Schmidt | |
| 2015/0043111 | A1 | 2/2015 | Koch et al. | |
| 2016/0059806 | A1 * | 3/2016 | Thommes | B60L 1/00 701/29.1 |

FOREIGN PATENT DOCUMENTS

| | | |
|---|---|---|
| DE | 102005041511 A1 | 3/2007 |
| DE | 102006015085 A1 | 9/2007 |
| DE | 102011084006 A1 | 4/2013 |
| DE | 102011088973 A1 | 6/2013 |
| EP | 2340957 A1 | 7/2011 |

OTHER PUBLICATIONS

DKE Deutsche Kommission Elektrotechnik Elektronik Informationstechnik im DIN und VDE; NORM DIN EN 50153 Bahnanwendungen-Fahrzeuge-Schutzmassnahmen in Bezug Auf Lektrische Gefahren; VDE Vertrags NR: 1115166; 2012.

* cited by examiner

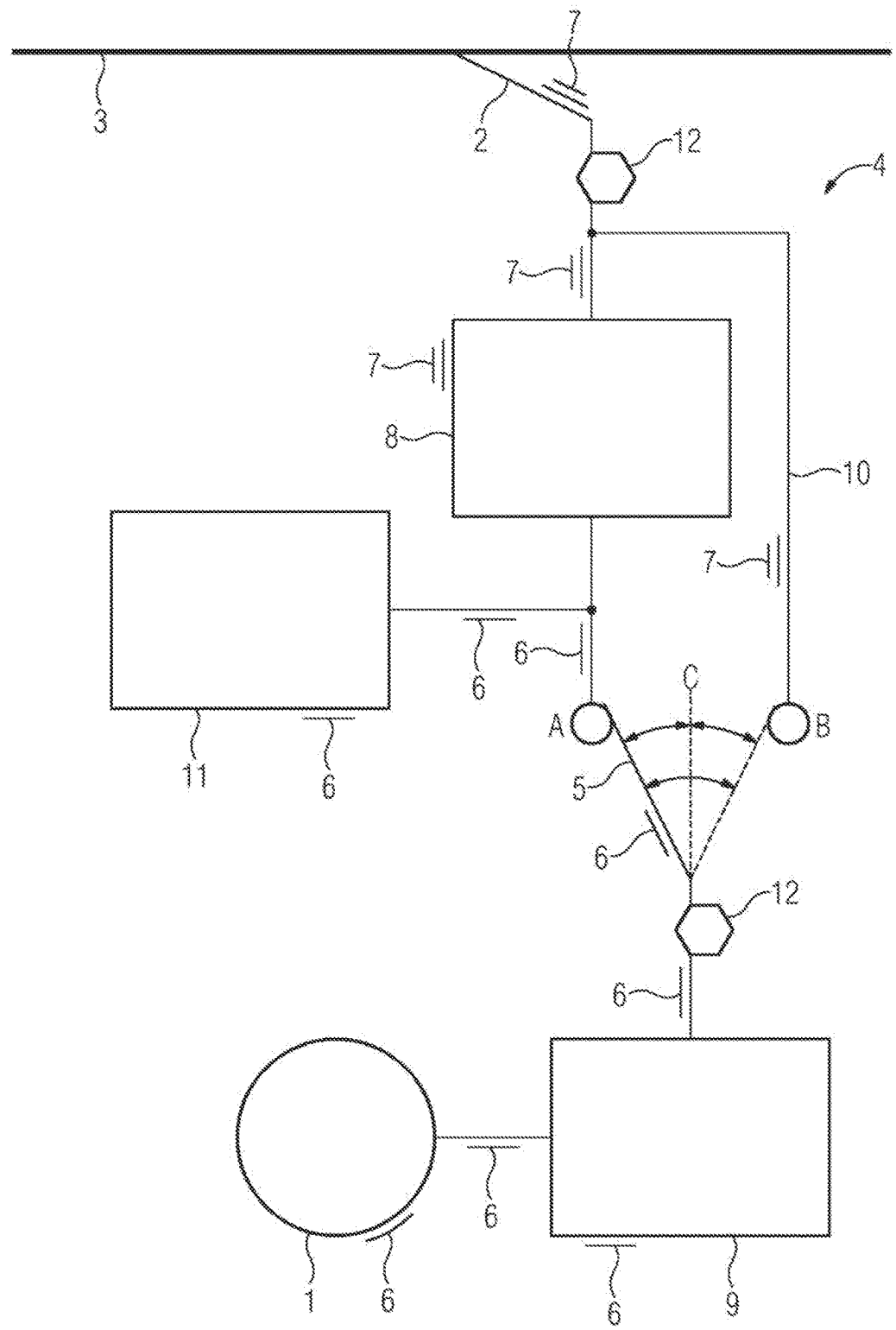

PROTECTION DEVICE FOR A VEHICLE FOR PREVENTING CONTACT VOLTAGES

BACKGROUND OF THE INVENTION

Field of the Invention

The invention relates to a vehicle having an ungrounded vehicle frame and a traction drive supported by the ungrounded vehicle frame. The vehicle further has a current collector which can be electrically connected to the traction drive and can be brought into galvanic contact with a contact line of a grounded contact line system to supply traction energy. An electrical protection system is provided for preventing dangerous contact voltages on the ungrounded vehicle frame or on a vehicle part conductively connected thereto.

In a vehicle having a purely electric traction drive or a hybrid-electric traction drive in which an electric motor can be coupled to an internal combustion engine or to a fuel cell, for example, the traction drive is supported by an ungrounded vehicle frame. If the vehicle has a current collector which can be connected to the traction drive and brought into galvanic contact with a contact line of a grounded contact line system to supply traction energy, the vehicle must possess an electrical protection system to prevent dangerous contact voltages on the vehicle frame or on a vehicle body conductively connected thereto. The protection system must electrically isolate the vehicle frame and vehicle body from the traction drive and current collector in galvanic contact with the contact line. If the protection system fails, dangerous contact voltages can occur on the vehicle frame or vehicle body which, in the event of a short circuit to frame through a person connected to the contact line system via ground, can produce shock currents resulting in injury or even death.

This applies to both diesel-electric trucks of the type used in opencast mining, for example, which are electrically connected to a contact line system only in sections, and to vehicles such as electric trolleybuses, for example, which are continuously electrically connected to a contact line system. Unlike in the case of rail vehicles, the track wheels of which constitute a conductive connection between vehicle frame and grounded running rails, the vehicle frames of trucks and trolleybuses are ungrounded because of their rubber-tired wheels.

In the case of trolleybuses it is known to implement the protection system by means of double insulation, both insulating layers of which are continuously or regularly monitored by technical means. If a fault occurs in one of the insulating layers, this is indicated and the fault can be repaired before the second insulating layer fails.

Thus, published unexamined German patent application DE 10 2005 041 511 A1 discloses a method for detecting and monitoring insulation distances and contact voltages in trolleybuses. The trolleybus can be connected to a grounded overhead wire system and possesses an at least two-stage insulation system having at least one intermediate insulation plane between chassis and overhead wire. The difference between chassis potential and a reference potential is measured by means of a chassis voltage measuring device. The chassis voltage measurement is compared with a predefined value and, if the chassis voltage value exceeds a predefined value, an alarm signal is generated. The difference between intermediate potential and reference potential is measured at at least one intermediate point of the intermediate insulation plane by means of an intermediate voltage measuring device. The intermediate voltage measuring device and/or the chassis voltage measuring device comprise a microprocessor by which the intermediate voltage value is compared with a predefined value, and an alarm signal is generated by the microprocessor if the intermediate voltage value exceeds a predefined value.

Published unexamined German patent application DE 10 2004 018 521 A1 shows a drive unit for a contact wire powered vehicle. It comprises at least one electric drive machine, a current collector having at least one go and return conductor which is in detachable electrical contact with at least two essentially fixed contact wires, wherein the return conductor of the current collector is assigned to a least one contact wire which is at grounded voltage potential. The drive unit also comprises live parts which are disposed between the current collector and the electric drive machine and/or within the electric drive machine. The electrical insulation of the live parts is provided at least in certain areas as double insulation and comprises a first electrical insulation, a second electrical insulation and an electrically conductive intermediate layer between the first electrical insulation and the second electrical insulation.

Section 5 of the 2012 draft German Standard DIN EN 50153 (VDE 0115-2) concerning railway applications—rolling stock—protective provisions relating to electrical hazards stipulates protective provisions against direct contact. Thus, active parts which can cause an electric shock must be protected against direct contact. All types of equipment must be operated such that protection against direct contact is not lost. Protection against direct contact must be provided at least by insulation or by preventing access. In addition to the requirements of EN 50124-1, insulating materials used for covering active parts must be suitable for the RMS operating voltage and the conditions of use of the equipment. Other precautions must be taken into consideration in order to minimize the effects of damage.

However, double insulation requires electrically double-insulated mounting of the entire drive train. This type of protection system is very complex/costly for diesel-electric hybrid vehicles, especially of so-called parallel design, as it additionally involves the diesel-mechanical drive train, consisting of an internal combustion engine, transmission and cardan shaft, incorporated deep within the vehicle.

Published unexamined German patent application DE 10 2011 088 973 A1 discloses a method for controlling a voltage limit for a maximum permissible operating voltage in a vehicle electrical system, comprising an adjustment device for adjusting the voltage limit according to vehicle data. By this means, depending on the vehicle situation and condition, different upper limits can be specified for the voltage in a vehicle electrical system and thus the voltage available in the electrical system can be efficiently stored and used at any time. For example, the voltage limit can be adjusted according to the speed or acceleration of the vehicle. In addition, the vehicle data can be data relating to the activation or deactivation of a braking system, e.g. during actuation of a brake pedal. The vehicle data can also be data relating to the state of locking or closure of particular parts of the vehicle, such as an engine hood or battery cover.

Published unexamined German patent application DE 10 2006 015 085 A1 discloses a device for receiving electrical energy from a current collector and transmitting it to at least one energy converter, such as an electric traction motor, a transformer, an electric compressed air generator, an electric air conditioning system or similar, disposed inside a rail traction vehicle or train. Its elements comprise at least one voltage transformer, a main switch, a main switch control unit, an energy meter, and a current transformer. It is provided that the voltage transformer, main switch, main switch control unit, energy meter and current transformer are combined to form a prefabricatable unit or module by integrating them in a common housing, by flanging their housings together or by integrating at least some elements in the common housing and flanging the remaining elements to the common housing, possibly together with a roof section.

A rubber-tired vehicle is known from Published unexamined German patent application DE 33 43 590 A1 which draws power by means of an overhead contact wire. Disposed on the vehicle is a voltmeter for the running measurement of the voltage potential difference between a vehicle body insulated with respect to ground and a flexible grinding belt, which is fastened to the vehicle body in an electrically insulated manner and grinds on the roadway surface with its other end. Connected downstream of the voltmeter is a comparator, which compares the measured value for the voltage difference with a specified threshold. If a current-conducting contact wire section comes into contact with the vehicle body due to a break or sag which is too great, this carries a life-threatening voltage for the duration of the contact, which leads to the threshold being exceeded. In this case, the comparator automatically activates a transmitter which transmits a disabling signal to a spatially remote receiver in a second position, for example a transformer station. The receiver is assigned a switch, which is used over the course of the contact wire to interrupt the current. If the disabling signal is transmitted to the receiver, the switch is opened at an expedient point of the overhead wire system, so that the conductor section with which the vehicle body is in contact is disconnected from the current.

Vehicles are also known to operate only in an enclosed and publically inaccessible travel range, such as in an opencast mining area in which the contact line system is installed. The drivers of these vehicles are persons familiar with the contact line system. These vehicles have a protection system comprising merely single insulation of the electric drive system. As no persons are present in the travel range of the vehicles connected to the grounded contact line system and the driver is on the vehicle while it is moving, no danger to personnel arises in the event of an insulation failure of the electric drive system. As soon as the vehicle comes to a standstill within the travel range, the connection to the contact line system is broken, e.g. by the current collector being lowered from the overhead line. Therefore there is again no danger to personnel.

BRIEF SUMMARY OF THE INVENTION

The object of the invention is to provide a vehicle of the type mentioned in the introduction, the protection system of which provides adequate safety in all operating states of the vehicle, but can also be incorporated in the vehicle in an economically viable manner.

The object is achieved by a generic vehicle having a protection system which has a second protection stage, which is constituted by electrically single-insulated mounting at least of the traction drive on the vehicle frame, and a first protection stage, which is additionally constituted by an electrically isolating DC-DC converter which is connected between current collector and traction drive, and a switching element by means of which the protection system can be switched between the first and the second protection stage through the optional connection in circuit or bypassing of the DC-DC converter. The first protection stage provides a higher level of safety from dangerous contact voltages than the second protection stage. The traction drive can be supplied with traction energy from the contact line in both protection stages. The invention is based around the insight that the protection system has to meet different safety requirements in different operating states of the vehicle which are characterized by different possible interactions between persons and vehicle. In a first operating state—e.g. when the vehicle is stationary—it is possible for a driver or third party to touch the vehicle frame or vehicle body from the outside without at the same time being at risk of injury due to mechanical trauma; in this operating state, the risk of injury due to shock currents is predominant. In a second operating state—e.g. when the vehicle is traveling at high speed—it is virtually impossible for a third party to touch the vehicle frame or vehicle body from the outside without being at risk of injury resulting from collision with the vehicle. The second protection measure can be implemented inexpensively and meets the safety requirements placed on the second protection stage during vehicle operation. It is designed for operation of the vehicle at higher running speeds. Some selected areas between traction drive and vehicle frame can also be double-insulated. The DC-DC converter has a low rated power compared to the full rated power of the traction drive and is used to supply the electric traction drive at low running speed. The first protection stage is used for starting and traveling at low speeds. In this operating state the traction drive is optionally assisted by an internal combustion engine or other on-board energy source. At higher running speeds, the electrically isolating DC-DC converter is bypassed by an alternate path and the traction energy is taken directly from the contact line. In this second protection stage of the protection system, the single-insulated components of the drive system are no longer electrically isolated from the contact line system or from the possibly double-insulated area. A protection system having two protection stages can be inexpensively implemented, particularly compared to completely double-insulated mounting of the traction drive in the vehicle frame. By means of the technical possibility of switching the protection system between two protection stages offering different degrees of protection from contact voltages, safe operation of the vehicle can be ensured by providing that, in each operating state, the particular protection stage sufficing in that operating state and therefore assigned thereto is active. Similarly, three or more protection stages of the protection system can also be provided if more than two operating states are to be differentiated.

In an advantageous embodiment of the vehicle according to the invention, the protection system has a sensor device for detecting an operating state of the vehicle, and a control device which operates in conjunction with the sensor device and the switching element and is designed to automatically actuate the switching element depending on the operating state detected. The operational safety of the vehicle according to the invention is further increased by the automated detection of the operating state and switching of the assigned protection stage.

In a preferred embodiment of the vehicle according to the invention, the sensor device has a speed measuring instrument for measuring the running speed of the vehicle, wherein a first operating state assigned to the first protection stage is defined by running speeds up to a predefinable threshold value, whereas a second operating state assigned to the second protection stage is defined by running speeds exceeding the predefinable threshold value. To define the operating state, a threshold value for the running speed, e.g. 5 km/h or 10 km/h or 15 km/h, can be specified. If the vehicle is stationary or is moving at a speed below the threshold value, the protection system is switched to the first protection stage providing greater electrical safety, as here the consequences of a shock current injury are more serious than those of a body collision injury. If the threshold value is exceeded, the protection system can be switched to the second protection stage, as in this operating state a collision accident is already likely to result in severe injury to persons.

In another preferred embodiment of the vehicle according to the invention, the sensor device has a current measuring instrument for measuring the intensity of a traction current arising as energy is supplied from the contact line, wherein a first operating state assigned to the first protection stage is defined by traction currents up to a predefinable threshold value, whereas a second operating state assigned to the second protection stage is defined by traction currents above a predefinable threshold value. Alternatively or in combination with the above mentioned, the operating state can be determined by a threshold value for the traction current drawn or the traction power supplied. Switching of the protection system from the first to the second protection stage due to the traction current intensity being exceeded can be advantageous, for example, when the vehicle is started up. It can be assumed that the driver of the vehicle will then accelerate if the situation allows, i.e. he can see no persons outside the vehicle who are at risk of contact. This acceleration of the vehicle is detected by the current measuring instrument if the traction current drawn exceeds the threshold value.

In an advantageous embodiment of the vehicle according to the invention, the sensor device has a door close sensor for detecting if a vehicle door is closed and/or a seat occupancy sensor for detecting if a vehicle seat is occupied and/or a seat belt sensor for detecting if a vehicle seat belt is buckled, wherein in contradistinction to a first operating state assigned to the first protection stage, a second operating state assigned to the second protection stage is defined by a vehicle door closed from the inside and/or an occupied vehicle seat and/or a buckled driver seat safety belt. Alternatively to or in combination with the above mentioned, the operating state can be determined by a sensor-detected behavior of the driver and passengers of the vehicle. Thus, switching over from a first to a second protection stage can be triggered by the sensor device detecting that the vehicle doors were closed from the inside, that vehicle seats were occupied and that vehicle seat belts were buckled. It can be inferred therefrom, irrespective of the running speed or traction current, that the risk of external vehicle contact is low or completely eliminated for drivers or passengers. Conversely, the protection system is switched back to the first protection stage as soon as a vehicle door has been opened, for example. The operating state changes described here which result in switchover of the protection system are indicated particularly for operation in secluded areas to which no untrained persons have access.

In a preferred embodiment of the vehicle according to the invention, the switching element can be manually actuated by means of an on-board operator control element and/or can be remotely actuated by means of a communication device for wireless data transmission and an operator control device interoperating therewith. This makes it possible for the driver or an operator in a control center of the contact line system to actively operate the switching element. This enables erroneous switching actions that have taken place automatically to be corrected. In addition, the protection system can be switched over if the vehicle goes from a public operating area to a non-public operating area in which touching of vehicles in contact with the contact line system externally by third parties is ruled through training or other technical provisions.

The vehicle according to the invention preferably comprises an electrical energy store for supplying the traction drive, wherein the energy store can be charged from the contact line when the DC-DC converter is connected in circuit. The DC-DC converter is used in the first operating state assigned to the first protection stage to charge the vehicle's energy store, e.g. an accumulator or capacitor battery. In addition, the DC-DC converter is used in the first operating state for traveling at low speed. Energy from the vehicle's energy store or internal combustion engine can also be used. At switchover to the second operating state, e.g. at higher running speeds, the electrically isolating DC-DC converter is bypassed and the traction energy is taken directly from the contact line. Also in this second operating state, the energy present in the energy store is available as traction energy. In both operating states, the DC-DC converter stabilizes the supply of energy for the energy store.

In another advantageous embodiment, the vehicle according to the invention comprises a monitoring device for detecting and indicating insulation faults in the insulation between traction drive and vehicle frame. To increase the operating safety of vehicles according to the invention still further, the single and/or double insulation is monitored for faults. If an insulation fault is indicated, action can be initiated promptly: for example, the driver can be instructed to drive the vehicle to a repair shop.

In another advantageous embodiment of the vehicle according to the invention, the switching element has a neutral mid-position in which neither the first nor the second protection stage of the protection system is selected. In this mid-position, insulation faults on the drive system side can be located. In addition, the mid-position of the switching element can be used to match the voltage level on the drive system side to that of the contact line in order to prevent a voltage jump when the switching element switches to the first or second protection stage.

Further features and advantages of the invention will emerge from the following description of an exemplary embodiment with reference to the accompanying drawings in which the sole FIGURE illustrates schematic diagram of a vehicle and protection system according to the invention.

BRIEF DESCRIPTION OF THE DRAWING

The single FIGURE of the drawing is an illustration of a heavy-duty commercial vehicle according to the invention.

DESCRIPTION OF THE INVENTION

Not shown in the FIGURE are per se known parts of a vehicle, e.g. a heavy-duty commercial vehicle, such as a vehicle frame, wheel axles with rubber-tired wheels, a driver's cab with vehicle doors, vehicle seats and seat belts, and a vehicle body for transporting goods. The vehicle frame also supports a traction drive 1 which is of purely electric or hybrid-electric design and the torque of which can be transmitted through gears to wheels. For route sections having a contact line system, e.g. a bipolar overhead line system, the contact line 3 of which has two contact wires suspended above the roadway and designed as go and return paths, the vehicle comprises a current collector 2 for the external supply of traction energy. The current collector 2 has a framework that can be raised and lowered and which carries a rocker with contact strips. By means of the contact strips, galvanic contact is established between current collector 2 and contact line 3 in order to feed traction energy to the vehicle or feed braking energy back into the contact line. The framework of the current collector 2 can also be transverse with respect to the direction of travel of the vehicle so that, for example, lateral driving inaccuracies can be compensated in order to always ensure reliable contact between current collector and contact line during operation. If galvanic contact between current collector 2 and contact line 3 is lost or on route sections without a contact line system, the diesel-electric traction drive 1 can be supplied with traction energy via a diesel generator set or from an optional energy store 11 of the vehicle, e.g. electric double-layer capacitors and/or batteries such as nickel-metal hydride batteries.

The vehicle has an electrical protection system 4 for preventing dangerous contact voltages on the vehicle frame or on vehicle parts conductively connected thereto, such as a driver's cab or a vehicle body for transporting goods. Because the vehicle is insulated from contact with the ground via rubber-tired wheels, the vehicle frame is not grounded. In order to prevent dangerous contact voltages on the vehicle frame when galvanic contact is established between the contact line 3 of the grounded contact line system and the current collector 2 and therefore the traction drive 1, the protection system 4 must provide electrical isolation between the vehicle parts that can be conductively connected to the current collector 2 and traction drive 1 and the vehicle parts that are conductively connected to the vehicle frame. In the event of failure of the protection system 4, a short circuit between vehicle frame and ground through a person standing on the ground and touching the vehicle from the outside can produce life-threatening shock currents. The protection system 4 inventively has a first protection stage A and a second protection stage B, and a switching element 5 by means of which the protection system 4 can be switched between the first protection stage A and the second protection stage B. Said first protection stage A provides greater electrical protection from dangerous contact voltages than the second protection stage B.

The second protection stage B of the protection system 4 is constituted by electrically single-insulated mounting of the traction drive 1 on the vehicle frame. The area having a single insulating layer 6 includes, in addition to the traction drive 1, the energy store 11, the switching element 5 and an inverter 9 connected upstream of the traction drive 1 for converting direct current to alternating current. In addition to the single insulation, the first protection stage A of the protection system 4 is constituted by an electrically isolating DC-DC converter 8 connected between current collector 2 and traction drive 1, which DC-DC converter 8 can be either connected in circuit or bypassed by means of the switching element 5 or by means of a parallel bypass jumper 10. The current collector 2, DC-DC converter 8 and bypass jumper 10 belong to an area having a double insulating layer 7.

In the protection stage A, all the vehicle parts electrically connected to the contact line 3 are double-insulated from the vehicle frame, either by insulated mounting or by electrical isolation. The double insulation is continuously monitored by suitable monitoring devices 12. In the second protection stage B, some or all of the vehicle parts electrically connected to the contact line 3 are single-insulated from the vehicle frame. This insulation can also be monitored by monitoring devices 12.

The protection system 4 is now switched according to the operating state of the vehicle, wherein the first protection stage A is assigned to a first operating state and the second protection stage B to a second operating state. The determining factor for the first operating state is that it is possible for the driver or for a third party standing outside to touch the vehicle from the outside without at the same time risking extensive injury from other hazards. The determining factor for the second operating state is that it is impossible or virtually impossible for third parties standing outside to touch the vehicle from the outside without at the same causing or posing a high risk of severe mechanical damage or an accident involving personal injury. Further differentiations of operating states and assigned protection stages of the protection system 4 can be similarly implemented.

The operating states can be differentiated, for example, on the basis of the level of running speed of the vehicle or the level of intensity of the traction current arising from supplying traction energy. The electrically isolating DC-DC converter installed in the vehicle is used to supply the traction drive 1 at low running speeds. In this case the protection system 4 is switched to protection stage A which is used for starting and traveling at low speeds. As a result, a DC-DC converter 8 having comparatively low rated power can be used. At higher speeds, the protection system 4 is switched to protection stage B by bypassing the electrically isolating DC-DC converter 8 by a bypass jumper 10 and taking the traction energy directly from the contact line 3. The vehicle parts having a single insulating layer 6 are now no longer separated by electrical isolation from the area of double-insulating layer 7 and the external contact line 3.

In the case that the vehicle has the optional energy store 11 available, when protection stage A is connected the DC-DC converter 8 is used to charge the energy store 11. In addition, the DC-DC converter 8 is used for traveling at low speed. Traction energy from the energy store 11 or diesel generator set of the vehicle can also be used. The energy available as traction energy in the energy store 11 is also available at higher speeds after switching to protection stage B, where traction energy is primarily taken directly from the contact line 3. In both protection stages A and B, the DC-DC converter 8 stabilizes the energy supply for the energy store 11.

The operating states of the vehicle can be determined on the basis of the running speeds or traction currents detectable by a speed measuring instrument and/or a current measuring instrument and, alternatively thereto or in combination therewith, by ascertaining whether a vehicle door is closed and/or whether a vehicle seat is occupied and/or whether a vehicle seat belt is buckled. Thus, switching of the protection system 4 from protection stage A to protection stage B can be triggered when the vehicle doors are closed from the inside or when the vehicle seats are occupied and the driver and passenger seat belts thereof are buckled. The system can be switched back regardless of the running speed if the vehicle door is opened.

In addition to this automatic switching which can be implemented by a control device operatively connected to the switching element 5 and to corresponding detection devices, manual switching of the protection system 4 by the driver is also possible via an on-board operator control element when the vehicle leaves the public operating area and enters a non-public operating area in which touching of the vehicle from the outside by third parties is ruled out due to training or other technical provisions. It is also possible for the protection system 4 to be switched over by third parties via a remotely actuatable operator control device, e.g.

for operation in defined areas, for different contact line systems or in the event of accidents.

The switching element 5 can also have a neutral mid-position C in which neither the first protection stage A nor the second protection stage B of the protection system 4 is selected. In this mid-position C, insulation faults on the drive system side can be located. In addition, the mid-position C of the switching element 5 can be used to match the voltage level on the drive system side to that of the contact line 3 in order to prevent a voltage jump when the switching element 5 switches to the first or second protection stage A or B.

According to the invention, DC-DC converters 8 which do not have the full rated power of the drive system as a whole can be used to transmit the voltage from the contact line 3 to the traction drive 1. DC-DC converters having this full rated power—if available at all—would be very large, heavy and expensive, very awkward to install in the vehicle and characterized by efficiency losses of at least 5% for the continuous use then required. Alternatively, the entire drive train, including diesel generator set, transmission, shafts, etc., would have to be of double-insulated design, which would involve considerable cost/complexity.

All in all, the invention is based around the operating-state-specific and therefore indirectly power-dependent varying of the protection system 4. The e.g. speed-dependent switching of the protection system 4 takes account of the assessment of risk in terms of the electrical and mechanical hazards in that, above a certain running speed, the overall risk resulting from touching of the vehicles from the outside is independent of the protection system 4. The protection system 4 according to the invention makes it possible to ensure safe operation of the vehicles without posing an electrical hazard to vehicle drivers or third parties in all propulsion modes, i.e. in hybrid mode without contact with a contact line system or in electrical mode involving continuous contact with a contact line system, and at all speeds including stationary. The protection system 4 according to the invention can also be used for other hybrid vehicles or purely electrically powered, non-track-guided vehicles having an external continuous energy supply via a contact line.

The invention claimed is:

1. A vehicle, comprising:
an ungrounded vehicle frame;
a traction drive supported by said ungrounded vehicle frame and selected from the group consisting of an electric traction drive and a hybrid-electric traction drive;
a current collector being electrically connected to said traction drive and can be brought into galvanic contact with a contact line of a grounded contact line system to supply traction energy; and
an electrical protection system for preventing dangerous contact voltages on said ungrounded vehicle frame or on a vehicle part conductively connected thereto, said electrical protection system having a second protection stage, being constituted by electrically single-insulated mounting at least of said traction drive on said ungrounded vehicle frame, and a first protection stage, being additionally constituted by an electrically isolating DC-DC converter which is connected between said current collector and said traction drive, said electrical protection system further having a switching element by means of which said electrical protection system can be switched between said first protection stage and said second protection stage through an optional connection in circuit or bypassing of said DC-DC converter, wherein said first protection stage providing a higher degree of safety from the dangerous contact voltages than said second protection stage, and said traction drive being supplied with the traction energy from the contact line in both said first and second protection stages.

2. The vehicle according to claim 1, wherein said electrical protection system has:
a sensor device for detecting an operating state of the vehicle; and
a control device interoperating with said sensor device and said switching element, said control device configured to automatically actuate said switching element depending on the operating state detected.

3. The vehicle according to claim 2, wherein:
said sensor device has a speed measuring instrument for detecting a running speed of the vehicle; and
a first operating state assigned to said first protection stage is defined by running speeds up to a predefinable threshold value, whereas a second operating state assigned to said second protection stage is defined by the running speeds above the predefinable threshold value.

4. The vehicle according to claim 2, wherein:
said sensor device has a current measuring instrument for measuring an intensity of a traction current arising from energy supplied from the contact line;
a first operating state assigned to said first protection stage is defined by traction currents up to a predefinable threshold value; and
a second operating state assigned to said second protection stage is defined by the traction currents above the threshold value.

5. The vehicle according to claim 2, wherein said sensor device has at least one of a door close sensor for detecting if a vehicle door is closed, a seat occupancy sensor for detecting if a vehicle seat is occupied, or a seat belt sensor for detecting if a vehicle seat belt is buckled, wherein in contradistinction to a first operating state assigned to said first protection stage, a second operating state assigned to said second protection stage is defined by at least one of the vehicle door being closed from an inside, occupied vehicle seat or a buckled driver seat belt.

6. The vehicle according to claim 1, further comprising:
an on-board operator control element;
a communication device for wireless data transmission; and
an operator control device, wherein said switching element being manually actuated by means of said on-board operator control element and/or being remotely actuated by means of said communication device for wireless data transmission and said operator control device interoperating therewith.

7. The vehicle according to claim 1, further comprising an electrical energy store for traction supply of said traction drive, said electrical energy store being charged from the contact line when said DC-DC converter is connected in circuit.

8. The vehicle according to claim 1, wherein said electrical protection device further having a monitoring device for detecting and indicating insulation faults in said electrically single insulated mounting between said traction drive and said ungrounded vehicle frame.

9. The vehicle according to claim 1, wherein said switching element has a neutral mid-position in which neither said first protection stage nor said second protection stage of said electrical protection system is selected.

* * * * *